(12) United States Patent
Alexander et al.

(10) Patent No.: US 7,769,984 B2
(45) Date of Patent: Aug. 3, 2010

(54) DUAL-ISSUANCE OF MICROPROCESSOR INSTRUCTIONS USING DUAL DEPENDENCY MATRICES

(75) Inventors: Gregory W. Alexander, Pflugerville, TX (US); Brian D. Barrick, Pflugerville, TX (US); Lee E. Eisen, Round Rock, TX (US); John W. Ward, III, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/208,683

(22) Filed: Sep. 11, 2008

(65) Prior Publication Data

US 2010/0064121 A1      Mar. 11, 2010

(51) Int. Cl.
G06F 9/30 (2006.01)
G06F 9/40 (2006.01)
G06F 15/00 (2006.01)

(52) U.S. Cl. ..................................... 712/214
(58) Field of Classification Search ................. 712/217, 712/214
See application file for complete search history.

(56) References Cited

U.S. PATENT DOCUMENTS

| | | | |
|---|---|---|---|
| 6,035,388 A | 3/2000 | Choquette et al. | |
| 6,099,585 A | 8/2000 | Godfrey | |
| 6,192,462 B1 | 2/2001 | Tran et al. | |
| 6,334,176 B1 | 12/2001 | Scales, III et al. | |
| 6,785,841 B2 | 8/2004 | Akrout et al. | |

(Continued)

FOREIGN PATENT DOCUMENTS

CA      2528873      10/2001

(Continued)

OTHER PUBLICATIONS

Shen et al.; Modern Process Design: The Fundamentals of Superscalar Processors; Beta Edition; 2003; McGraw Hill.*

(Continued)

*Primary Examiner*—Eddie P Chan
*Assistant Examiner*—Corey Faherty
(74) *Attorney, Agent, or Firm*—Leveque IP Law, PC

(57) ABSTRACT

A dual-issue instruction is decoded to determine a plurality of LSU dependencies needed by an LSU part of the dual-issue instruction and a plurality of non-LSU dependencies needed by a non-LSU part of the dual-issue instruction. During dispatch of the dual-issue instruction by the microprocessor, the dual dependency matrices are employed as follows: a Load-Store Unit (LSU) dependency matrix is written with the plurality of LSU dependencies and a non-LSU dependency matrix is written with the plurality of non-LSU dependencies; an LSU issue valid (LSU IV) indicator is set as valid to issue; an LSU portion of the dual-issue instruction is issued once the plurality of LSU dependencies of the dual issue instruction are satisfied; a non-LSU issue valid (non-LSU IV) indicator is set as valid to issue; and a non-LSU portion of the dual-issue instruction is issued once the plurality of non-LSU dependencies of the dual issue instruction are satisfied. The LSU dependency matrix and the non-LSU dependency matrix can then be notified that one or more instructions dependent upon the dual-issue instruction may now issue.

1 Claim, 2 Drawing Sheets

U.S. PATENT DOCUMENTS

| | | |
|---|---|---|
| 7,062,636 B2 | 6/2006 | Baxter et al. |
| 7,330,963 B2 | 2/2008 | Baxter et al. |
| 7,350,056 B2 | 3/2008 | Abernathy et al. |
| 7,370,176 B2 | 5/2008 | DeMent et al. |
| 7,392,369 B2 | 6/2008 | Baxter et al. |
| 2003/0236966 A1* | 12/2003 | Samra et al. ............... 712/209 |
| 2007/0083742 A1 | 4/2007 | Abernathy et al. |
| 2007/0089102 A1 | 4/2007 | Erb |
| 2007/0198812 A1 | 8/2007 | Abernathy et al. |
| 2007/0204137 A1 | 8/2007 | Tran |
| 2008/0074433 A1 | 3/2008 | Jiao et al. |
| 2008/0148021 A1 | 6/2008 | DeMent et al. |

FOREIGN PATENT DOCUMENTS

| | | |
|---|---|---|
| WO | WO2007027773 | 3/2007 |
| WO | WO2007106959 | 11/2007 |
| WO | WO2008/042297 | 4/2008 |

OTHER PUBLICATIONS

Sheng et al.; Modern Processor Design: Fundamentals of Superscalar Processors; Beta Edition; 2003; pp. 177,179,196-201.*

* cited by examiner

DUAL-ISSUANCE OF MICROPROCESSOR INSTRUCTIONS USING DUAL DEPENDENCY MATRICES

BACKGROUND

Microprocessor operational instructions may be so-called dual-issue instructions, characterized as having a part of the instruction needed for an execution unit of the microprocessor, such as a Fixed Point Unit (FXU) or a Floating-Point Unit (FPU) of the microprocessor, and a part of the instruction needed for a non-execution portion of the microprocessor, such as a Load-Store Unit (LSU). Methods currently known for dual-issuance of microprocessor operational instructions for use with store instructions are useful for a microprocessor architectures characterized as having only a small subset of its instructions as dual-issue instructions. Microprocessor architectures that make greater use of dual-issue instructions, such as a register-memory architecture, require more robust ways of dependency tracking than is currently available.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

Figure 1:
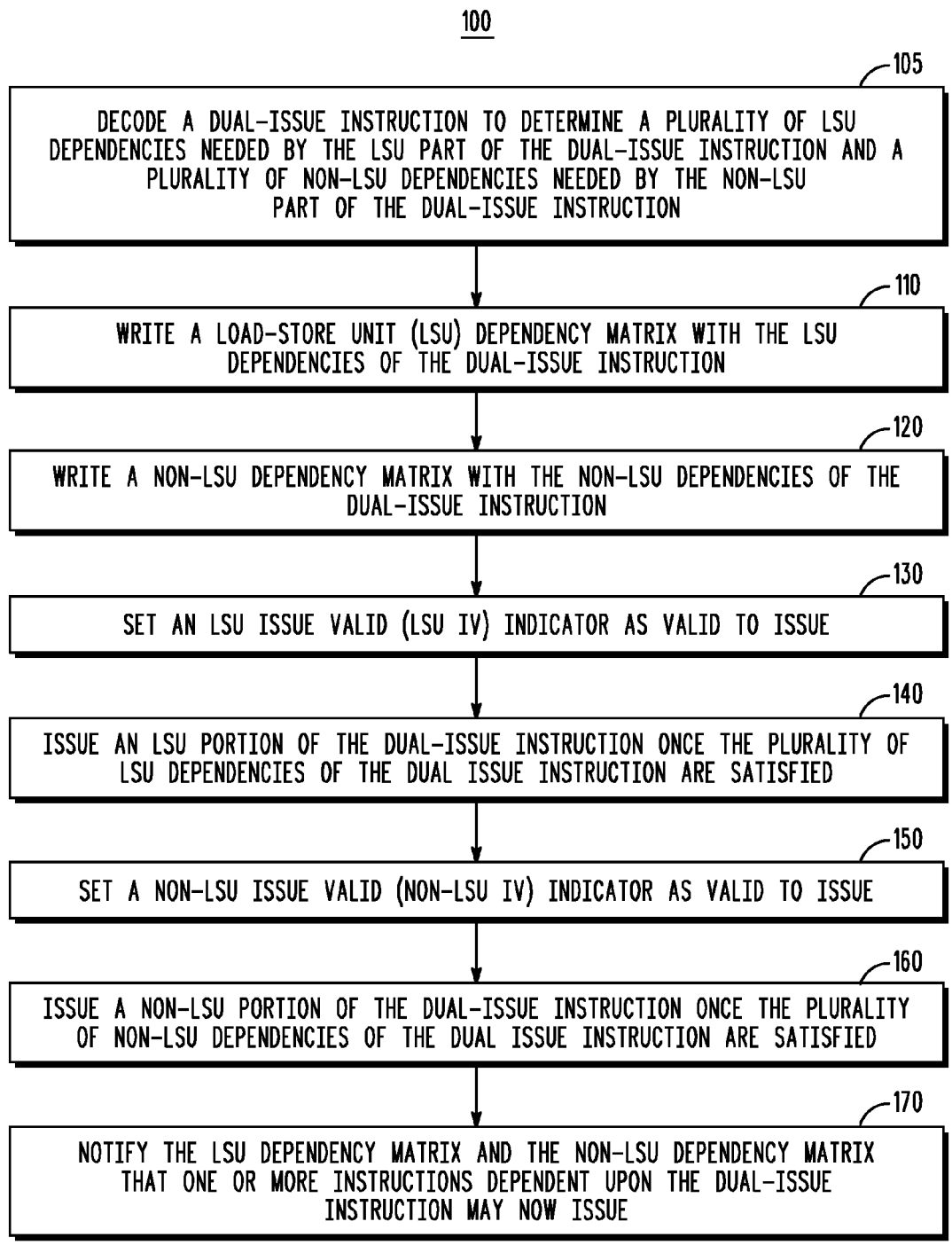
FIG. 1 is a functional flow diagram that illustrates dual issuance of operational instructions in a register-memory microprocessor architecture, in accordance with various embodiments disclosed herein.

A method and system provides for the dual-issuance of operational instructions in a register-memory microprocessor architecture. Register-memory microprocessor architectures, for instance, implement a wide variety of instructions as dual-issue and the method and system of the various embodiments disclosed herein support a more robust method of dependency tracking than has previously been required for stores. A second dependency matrix of the microprocessor is used to track Load Store Unit (LSU) instructions only, thereby allowing a full set of dependencies for both the LSU part and the non-LSU or Execution part of a dual-issuance operational instruction. Execution portions of instructions, the non-LSU part, are needed by the execution unit, such as a Fixed Point Unit (FXU) or a Floating-Point Unit (FPU).

An example of a register-memory instruction is to Read data from memory at the address in register R1 and add the value read from memory to the value in register R2, placing the result in register R3. This requires an LSU part to read the data from memory which is depend on the setting of register R1, and an FXU part to do the add operation, which is dependent on the setting of register R2 and implicitly dependent on the LSU part reading the data in memory.

Thereby, in accordance with various embodiments, a dual-issue instruction is decoded to determine a plurality of LSU dependencies needed by the LSU part of the dual-issue instruction and a plurality of non-LSU dependencies needed by the non-LSU part of the dual-issue instruction. During dispatch of the dual-issue instruction by the microprocessor, the dual dependency matrices are employed as follows: a Load-Store Unit (LSU) dependency matrix is written with the plurality of LSU dependencies and a non-LSU dependency matrix is written with the plurality of non-LSU dependencies; an LSU issue valid (LSU IV) indicator is set as valid to issue; an LSU portion of the dual-issue instruction is issued once the plurality of LSU dependencies of the dual issue instruction are satisfied; a non-LSU issue valid (non-LSU IV) indicator is set as valid to issue; and a non-LSU portion of the dual-issue instruction is issued once the plurality of non-LSU dependencies of the dual issue instruction are satisfied. The LSU dependency matrix and the non-LSU dependency matrix can then be notified that one or more instructions dependent upon the dual-issue instruction may now issue.

When an instruction is dispatched, each of its dependencies may be marked by the Decode Logic (IDU) of the microprocessor as applying to the LSU part of the instruction, the non-LSU or EXE portion of the instruction, or both. LSU dependencies are placed in the LSU dependency matrix while non-LSU dependencies are placed in the non-LSU dependency matrix, as will be described. As used herein, a dependency matrix denotes an array having rows that correspond to instructions stored in an issue queue of the microprocessor and columns that correspond to dependencies tracked by the issue queue. The ready outputs from the dependency matrix may be conditioned (such as ANDed) with one or more Issue Valid (IV) vectors of the microprocessor composed of IV bits, with one IV bit per row per vector, to determine if the dual-issue instruction stored in that particular row of the issue queue is ready to issue, as will be described.

Reference is now made to simplified flow diagram 100 of FIG. 1, in accordance with various embodiments. Some preliminary decoding may be done during a decode operation performed by an instruction decode unit (IDU) of the microprocessor. As illustrated at Block 105, a dual-issue instruction is decoded to determine a plurality of LSU dependencies needed by the LSU part of the dual-issue instruction and a plurality of non-LSU dependencies needed by the non-LSU part of the dual-issue instruction. First the IDU determines if a particular instruction is dual issued. It also determines, in the event of a dual issued operational instruction, which dependencies, such as register sources, will be need by the LSU part of the instruction and which dependencies will be required for the non-LSU part (i.e. the execution) of the instruction, such as FXU or FPU portions of the microprocessor. After the decode, the decoded instruction is dispatched into the instruction sequencing unit (ISU) of the microprocessor, where it can be written to the dual dependency matrices, as will now be described.

At Blocks 110 and 120, the ISU will write a Load-Store Unit (LSU) dependency matrix with a plurality of LSU dependencies of a dual-issue instruction needed by the LSU part of the instruction and will write a non-LSU dependency matrix with a plurality of non-LSU dependencies of the dual issue instruction needed by the non-LSU part of the instruction. The order in which Blocks 110 and 120 are performed is flexible and these operations may be performed concurrently. Thus, during Dispatch, the ISU will write the LSU dependency matrix with only those dependencies need by the LSU (identified during the instruction decode) and will write the non-LSU dependency matrix with only those dependencies needed by the non-LSU (the execution unit portions of the microprocessor), also identified during the instruction decode.

A possible implementation, by way of illustration and not limitation, is to decode each dependency, AND that decode if that dependency is valid for the LSU; afterwards, all such ANDed dependencies may be ORed together into a dependency row to be written into the LSU dependency matrix. Similarly, the Non-LSU dependency matrix will AND each dependency if the dependency is valid for any non-LSU execution unit.

It is noted that those dependencies needed by only the LSU part of the instruction can also be written into the Non-LSU dependency matrix with no performance degradation, as the FXU/FPU part has an implicit dependency on the LSU part of the instruction.

During dispatch of the instruction, only an LSU Issue Valid (IV) indicator, such as a bit, is set, thereby allowing only the LSU part of the dual-issued instruction to issue. This is indicated at Block 130.

Next, once all of the LSU dependencies have been met, the LSU part of the instruction may be issued, as indicated at Block 140. When all of the LSU dependencies have been satisfied, the LSU dependency matrix will indicate that the LSU part of the instruction is ready to issue. The LSU part of the instruction is marked ready to issue. At some later time, the LSU part of the instruction is issued. The LSU IV bit is then cleared, or marked as not ready to issue. It is noted that the LSU part of the instruction can be ready to issue even when the non-LSU part, such as the FXU, FPU or other execution part of the instruction is not. At this time, the non-LSU issue valid (non-LSU IV) indicator, such as FXU/FPU IV bits, are off, thereby preventing issuance of the non-LSU part of the instruction.

After enough time has passed since the LSU part of the dual issue instruction has issued, the correct non-LSU IV indicator is set as valid to issue. Thus, perhaps after an adequate time, the appropriate bits, either FXU or FPU IV bits, are set as valid to issue. This is demonstrated at Block 150. Now, the dependencies needed by the non-LSU part of the instruction can be checked. Once all of the dependencies need by the execution units have been met and satisfied, the non-LSU dependency matrix will indicate that the execution unit, non-LSU part of the instruction is ready to issue. Once the appropriate execution unit non-LSU IV bit is set and the non-LSU dependency matrix indicates that the execution unit part of the instruction is ready to issue, the non-LSU part of the instruction will be marked ready to issue. Some time later, the execution part of the instruction is issued. The non-LSU IV bit is then cleared, or marked as not ready to issue. Thus, the non-LSU portion of the dual-issue instruction is only issued once the plurality of non-LSU dependencies of the dual issue instruction are satisfied, Block 160.

It is noted that those dependencies needed by both the LSU and the non-LSU parts of the instruction (such as a register used as both a memory address and an addend), or those dependencies needed only by the LSU part of the instruction (such as a memory address), will have been checked and cleared as having been satisfied/met during the procedure of Block 140. It is therefore implementation-dependent whether such dependencies will be also tracked in the non-LSU dependency matrix.

It is further noted that the dependency checking described above in conjunction with Block 160, may be performed currently with the dependency checking, marking as ready to issue and issuance of the LSU part of the instruction. Such might be the case, for example, if all dependencies are met the first time an instruction is dispatched. The issue of the non-LSU part of the instruction must follow execution of the LSU part of the instruction.

When enough time, with the length of time is determined by the particular instruction, has passed since the execution unit part, i.e. non-LSU part, of the instruction has issued, the LSU and the non-LSU dependency matrices are notified that other instructions dependent upon this particular instruction may now issue, at Block 170.

As an implementation-specific detail, meant by way of example and not limitation, consider the following. After the appropriate number of cycles have passed since the LSU part of the operation issues, the non-LSU part is speculatively marked as issue valid. If the LSU part of the instruction/operation is rejected, however, the LSU issue valid (LSU IV) indicator will be turned back on, and the non-LSU issue valid will be turned off. Results for this issue queue slot are not marked available when the LSU part issues, but only after results for the non-LSU part will be available.

Figure 2:
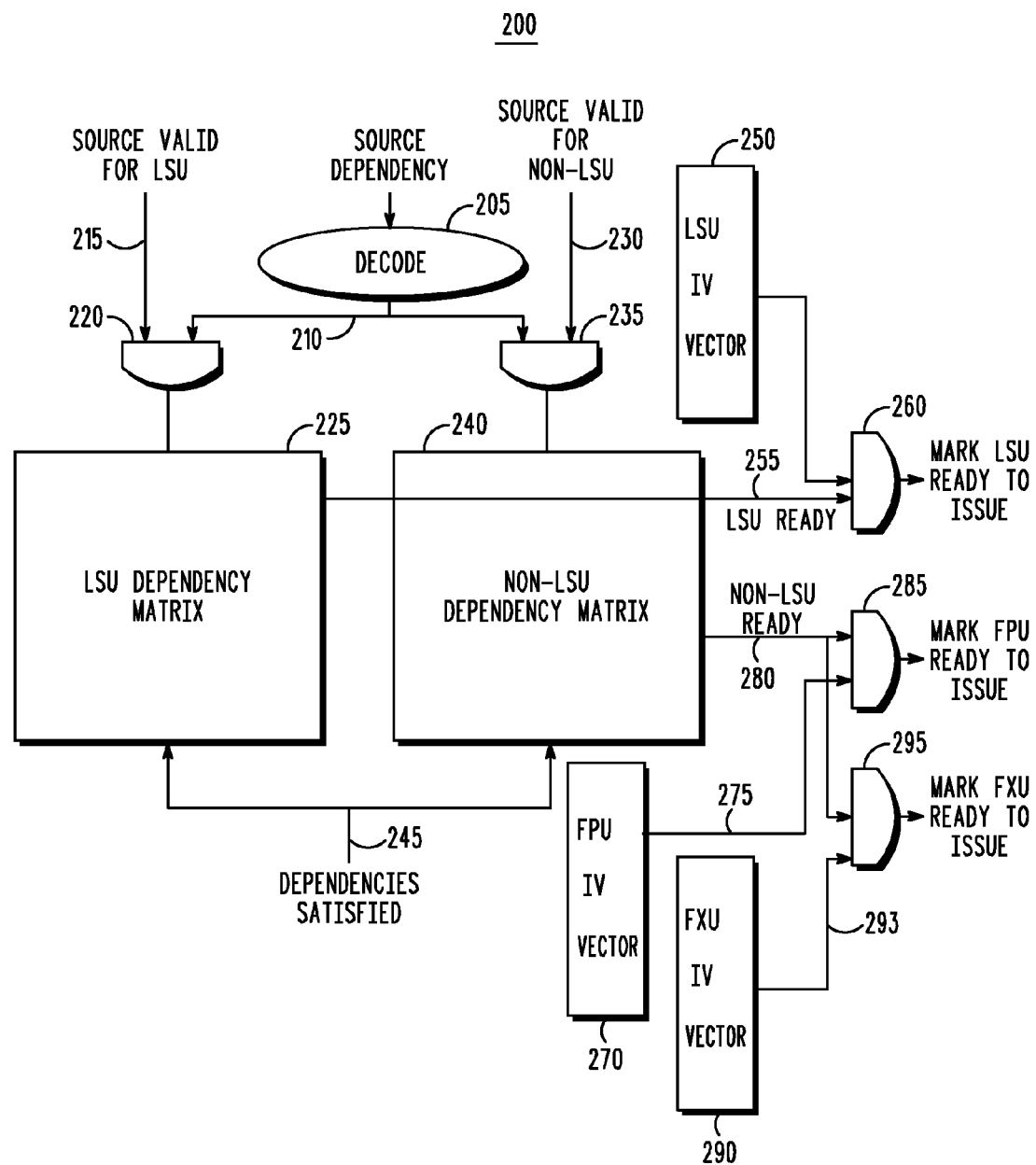
FIG. 2 is an architectural block diagram of a register-memory microprocessor architecture, in accordance with various embodiments disclosed herein.

The embodiments described above may be further understood by reference to exemplary architectural system diagram 200 of FIG. 2. On a dependency matrix write operation, a single decode may be used to generate dependency write data for both the LSU and the non-LSU matrices. That single decode may then be ANDed with the appropriate LSU or non-LSU source valid bit to generate the decoded source data for that source for that dependency matrix. It can be seen that each source dependency is decoded at decoder 210 to generate decoded dependencies 210. Each decoded dependency is ANDed if that dependency is valid. For example, an LSU dependency is ANDed with a source valid for LSU indicator 215 by logical AND function 220 and written to the LSU dependency matrix 225. As previously mentioned, all such ANDed dependencies may be ORed together into a dependency row to be written into the LSU dependency matrix 225. Similarly, the Non-LSU dependency matrix will AND each dependency if the dependency is valid for any non-LSU execution unit. A non-LSU dependency is ANDed with a source valid for non-LSU indicator 230 by logical AND function 235 and written to the non-LSU dependency matrix 240.

The LSU and non-LSU dependency matrices will each output their own ready vector, which may then be ANDed with the appropriate issue valid bits to determine if the part of an operation destined for a particular execution unit is ready to issue. For example, the LSU dependency matrix output will be ANDed with the LSU issue valid bits to determine the LSU ready vector. Where the Fixed Point Unit (FXU) and the Floating-Point Unit (FPU) parts of the execution unit are of interest, for example, the non-LSU dependency matrix output will be ANDed with the FXU issue valid bits to write the FXU ready vector, and the FPU issue valid bits will be ANDed with the non-LSU dependency matrix output to generate the FPU ready vector.

During dispatch of the instruction, only an LSU Issue Valid (IV) indicator, such as a bit, is set, thereby allowing only the LSU part of the dual-issued instruction to issue. This is indicated by the LSU IV vector 250 which provides an input, along with the LSU ready signal 255 from the LSU dependency matrix 225 to logical AND function 260, to produce the Mark LSU Ready to Issue output 265. In this manner, when all of the LSU dependencies have been satisfied, the LSU dependency matrix will indicate that the LSU part of the instruction is ready to issue. The LSU part of the instruction is marked ready to issue. At some later time, the LSU part of the instruction is issued. The LSU IV bit is then cleared, or marked as not ready to issue. It is noted that the LSU part of the instruction can be ready to issue even when the non-LSU part, such as the FXU, FPU or other execution part of the instruction is not. At this time, the non-LSU issue valid (non- LSU IV) indicator, such as FXU/FPU IV bits, are off, thereby preventing issuance of the non-LSU part of the instruction.

The issue of the non-LSU part of the instruction must follow execution of the LSU part of the instruction. After enough time has passed since the LSU part of the dual issue instruction has issued, the correct non-LSU IV indicator is set as valid to issue.

Once all of the dependencies need by the execution units have been met and satisfied, the non-LSU dependency matrix will indicate that the execution unit, non-LSU part of the instruction is ready to issue. Once the appropriate execution unit non-LSU IV bit is set and the non-LSU dependency matrix indicates that the execution unit part of the instruction is ready to issue, the non-LSU part of the instruction will be marked ready to issue. Some time later, the execution part of the instruction is issued. The non-LSU IV bit is then cleared, or marked as not ready to issue. Thus, the non-LSU portion of the dual-issue instruction is only issued once the plurality of non-LSU dependencies of the dual issue instruction are satisfied.

Thus, perhaps after an adequate time, FXU/FPU IV bits can be set as valid to issue. This is illustrated by the non-LSU ready signal 280 from the non-LSU dependency matrix 240. Now, the dependencies needed by the non-LSU part of the instruction can be checked. Once all of the dependencies needed by the execution units have been met and satisfied, as indicated by Dependencies Satisfied signal 245, the non-LSU dependency matrix will indicate that the execution unit, non-LSU part of the instruction is ready to issue. Once the appropriate execution unit non-LSU IV bit is set and the non-LSU dependency matrix indicates that the execution unit part of the instruction is ready to issue, the non-LSU part of the instruction will be marked ready to issue.

The non-LSU ready signal 280 and the FPU IV indicator 275 from FPU IV vector 270, both of which are received and ANDed by logic AND function 285 to generate Mark FPU Ready to Issue signal. Similarly, for the FXU consideration, the non-LSU ready signal 280 from non-LSU dependency matrix 240 and the FXU IV indicator 293 from FXU IV vector 290 are ANDed by logical AND function 295 to generate Mark FXU Ready to Issue signal.

Some time later, the execution part of the instruction is issued. The non-LSU IV bit is then cleared, or marked as not ready to issue. Thus, the non-LSU portion of the dual-issue instruction is only issued once the plurality of non-LSU dependencies of the dual issue instruction are satisfied.

In cases where an operation is not dual-issued, only one of the dependency matrices will be used, and the other will be ignored. The relevant issue valid bit of the used dependency matrix will be set. Results of the issue queue slot are marked available when the results of the single operation will be available. If an operation is dual-issued, only the LSU part is initially marked as issue valid.

It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, signal drivers, clock circuits, power source circuits, and user input devices. As such, these functions may be interpreted as a method to perform functions in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention. For example, the embodiments described herein encompass a hardware component that is part of a microprocessor and may be implemented using custom circuits or ASICs, or other implementations as desired.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

Various embodiments described herein are implemented using programmed processors executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of performing dual-issue of an instruction, having a Load-Store Unit (LSU) part and a non-LSU part, in a microprocessor, comprising:

decoding a dual-issue instruction to determine a plurality of LSU dependencies needed by the LSU part of the dual-issue instruction and a plurality of non-LSU dependencies needed by the non-LSU part of the dual-issue instruction;

during dispatch of the dual-issue instruction by the microprocessor, further comprising:

writing a Load-Store Unit (LSU) dependency matrix with the plurality of LSU dependencies, wherein the LSU dependency matrix is an array of rows that correspond to instructions stored in an issue queue of a centralized scheduling unit of the microprocessor and columns that correspond to dependencies tracked by the issue queue and wherein a row of the LSU dependency matrix corresponds to an issue queue slot;

writing a non-LSU dependency matrix with the plurality of non-LSU dependencies, wherein the non-LSU dependency matrix is an array of rows that correspond to instructions stored in the issue queue of the microprocessor and columns that correspond to dependencies tracked by the issue queue and wherein a row of the non-LSU dependency matrix corresponds to the issue queue slot;

setting an LSU issue valid (LSU IV) indicator as valid to issue;

issuing an LSU portion of the dual-issue instruction once the plurality of LSU dependencies of the dual issue instruction are satisfied;

setting a non-LSU issue valid (non-LSU IV) indicator as valid to issue;

issuing a non-LSU portion of the dual-issue instruction once the plurality of non-LSU dependencies of the dual issue instruction are satisfied; and notifying the LSU dependency matrix and the non-LSU dependency matrix that one or more instructions dependent upon the dual-issue instruction may now issue.

* * * * *